United States Patent [19]

Tokuda et al.

[11] Patent Number: 5,077,820
[45] Date of Patent: Dec. 31, 1991

[54] OPTICAL FIBER PHOTOCONDUCTOR HAVING MULTI-FILAMENT TYPE OPTICAL FIBER UNITS

[75] Inventors: Syuichiro Tokuda; Hidenori Osawa, both of Nagoya; Naohiro Yamamoto; Naoyuki Fukahori, both of Tokyo, all of Japan

[73] Assignee: Mitsubishi Rayon Company, Ltd., Tokyo, Japan

[21] Appl. No.: 568,726

[22] Filed: Aug. 17, 1990

[51] Int. Cl.$^5$ .............................. G02B 6/04
[52] U.S. Cl. .................... 385/116; 385/121
[58] Field of Search ............. 350/96.24, 96.25, 96.27

[56] References Cited

U.S. PATENT DOCUMENTS 4,768,857 9/1988 Sakunaga et al. ............ 350/96.24
4,812,012 3/1989 Terada et al. ................ 350/96.24
4,842,365 6/1989 Terada et al. ................ 350/96.24

FOREIGN PATENT DOCUMENTS 2-191905 7/1990 Japan .

Primary Examiner—John D. Lee
Assistant Examiner—John Ngo
Attorney, Agent, or Firm—Oblon, Spivak, McClelland, Maier & Neustadt

[57] ABSTRACT

An optical fiber photoconductor, comprising at least two multi-filament plastic optical fiber units arranged in parallel and having a substantially rectangular peripheral shape and at least one end fixed in a cap, each optical fiber unit having 50 to 10000 core-sheath light-transmitting islands having a diameter of 5 to 200μ, which are densely arranged in a sea portion, wherein in each of the multi-filament plastic optical fiber units having a rectangular sectional shape, the end face fixed in the cap is expanded so that the length of one side of the end face is at least 1.01 times the original length of one side of the rectangular peripheral shape of the multi-filament plastic optical fiber unit, whereby a bonding interface between the multi-filament plastic optical fiber units substantially disappears.

5 Claims, 4 Drawing Sheets

OPTICAL FIBER PHOTOCONDUCTOR HAVING MULTI-FILAMENT TYPE OPTICAL FIBER UNITS

BACKGROUND OF THE INVENTION

1. Field of the Invention

The present invention relates to an optical fiber photoconductor that can be effectively utilized as an image-transmitting member, a light guide or an optical sensor. More particularly, the present invention relates to an optical fiber photoconductor comprising at least two aligned multi-filament type plastic optical fibers, each optical fiber having a substantially rectangular sectional shape wherein 50 to 10000 core-sheath light-transmitting islands having a diameter of 5 to 200μ are densely arranged.

2. Description of the Related Art

An optical fiber photoconductor formed by laminating a plurality of units, each unit consisting of a multi-filament type plastic optical fiber as mentioned above, and bonding at least one ends of the units to one another with an adhesive, can be formed into an image-transmitting member having a large number of image-transmitting elements, and therefore, it is expected that the fields of application of this photoconductor will rapidly expand.

Nevertheless, in this conventional light-transmitting member, as shown in FIG. 2, spaces 22 among multi-filament type plastic optical fiber units 21 have a much larger area than the area of light-transmitting islands 23 constituting the optical fiber units, and since the spaces have neither an image-transmitting property nor a light-transmitting property, these spaces form dark field areas, which become non-image areas when the image-transmitting member is actually used. Therefore, the reflected picture is very difficult to see and an observer is quickly irritated thereby. When this photoconductor is used as the light guide, since bonding interfaces 22 between the multi-filament type optical fiber units become non-image-transmitting portions, the transmission efficiency is reduced and a uniform transmission of image becomes impossible.

SUMMARY OF THE INVENTION

The inventors investigated the development of a photoconductor in which the above-mentioned disadvantages are substantially moderated, and as a result, found that, when an adhesive used for spaces among the multi-filament type plastic optical fiber units in the conventional technique is not employed, but instead end face section of the fiber units are expanded by a heat treatment, a photoconductor capable of attaining the above object can be obtained. The present invention is based on this finding.

More specifically, in accordance with the present invention, there is provided an optical fiber photoconductor, which comprises at least two multifilament type plastic optical fiber units arranged in parallel and having a substantially rectangular peripheral shape and at least one end fixed in a cap, each optical fiber unit having 50 to 10000 core-sheath light-transmitting islands having a diameter of 5 to 200μ, which are densely arranged in a sea portion, wherein in each of the multi-filament type plastic optical fiber units having a rectangular sectional shape, the end face fixed in the cap is expanded so that the said one side length of the end cross section is at least 1.01 times the original one side length of the rectangular peripheral cross section of the multi-filament type plastic optical fiber unit, whereby a closing interface between the multi-filament type plastic optical fiber units is substantially vanished.

DESCRIPTION OF THE PREFERRED EMBODIMENTS

Figure 1:
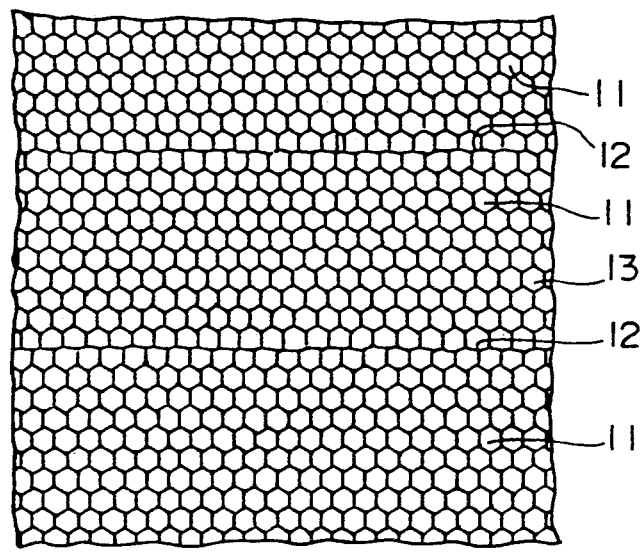
FIG. 1 is an enlarged front view of the closing interface between multi-filament optical fiber units of the optical fiber photoconductor of the present invention.

Referring to FIG. 1, which is an enlarged front cross section view of the closed end faces of multi-filament type optical fiber units of the optical fiber photoconductor of the present invention, the optical fiber photoconductor comprises multi-filament type optical fiber units 11 comprising light-transmitting core-sheath islands 13, and the optical fiber units 11 are bonded to one another through bonding interfaces 12. Accordingly, even when the optical fiber photoconductor of the present invention is used as an image-transmitting member or the like, these bonding interfaces 12 substantially resin to such an extent that the bonding interfaces do not become dark field areas, to thus irritate an observer.

Figure 2:
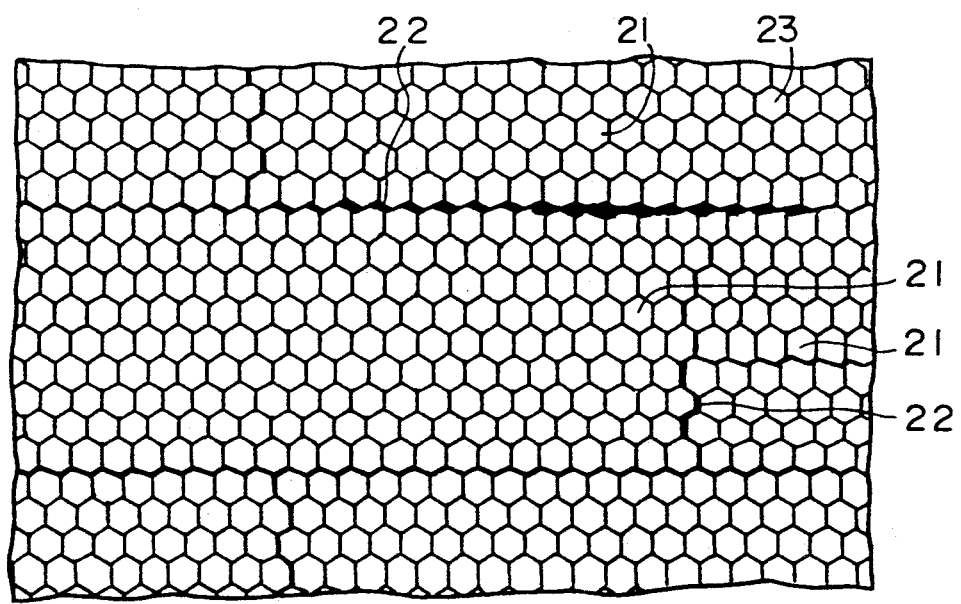
FIG. 2 is an enlarged front view of the bonding interface between multi-filament type optical fiber units of an optical fiber photoconductor having a cap portion fixed according to the conventional method.

The optical fiber photoconductor of the present invention can be prepared, for example, according to the process disclosed in Japanese Unexamined Patent Publication No. 63-299911. Namely, light-transmitting core-sheath islands having a diameter of about 5 to about 200μ and sea portions arranged concentrically around the peripheries of the islands are densely piled up in a pattern of stacked straw bags to form a multi-filament type optical fiber having a substantially rectangular peripheral shape, and a plurality of such multi-filament type optical fiber units are piled up so that one ends of the fiber units form a straight line or a rectangular shape. To pile up the end faces of the multi-filament type optical fiber units in a rectangular shape, a four-side stacking structure or a straw bag stacking structure is preferably adopted. The end portions of many multi-filament type optical fiber units piled up in the form of a pleet or in a rectangular shape are tightly fixed by a tool composed of a material having a high rigidity, such as aluminum, brass or a fiber-reinforced composite material. At this stage of termination of the fixation, the contact interfaces are in a condition as shown in FIG. 2. Namely, however mechanically strongly the multi-filament type optical fiber units 21 are clamped, the spaces 22 among the laminated fiber units 21 cannot be filled.

Figure 3:
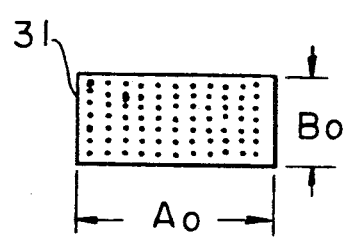
FIG. 3 is a diagram illustrating the dimensions before and after the expanding treatment.
Figure 3:
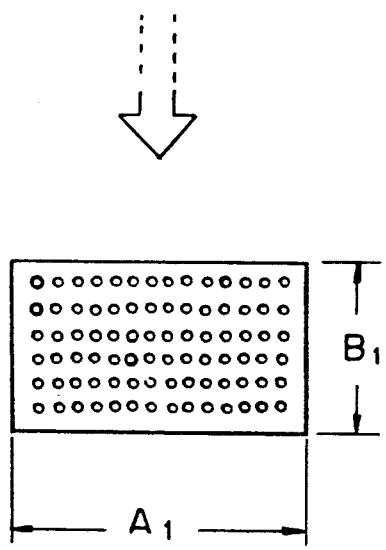

Therefore, according to the present invention, as shown in FIG. 3, the end face of the multi-filament type optical fiber unit 31 is subjected to an expanding treatment so that sides $A_0$ and $B_0$ of the rectangular section of the end face are increased to $A_1$ and $B_1$ and the following conditions are satisfied:

$$\frac{A_1}{A_0} \geqq 1.01 \text{ and } \frac{B_1}{B_0} \geqq 1.01.$$

By this treatment, the spaces 22 among the closed multi-filament optical fiber units 21, shown in FIG. 2, substantially expanded to form a boundary line 12 as shown in FIG. 1. If this optical fiber photoconductor of the present invention is used as an image-transmitting member, the boundary between the closed optical fiber units does not irritate an observer and the optical fiber photoconductor shows very good characteristics. The main reason of the attainment of this effect is that the clearance between the closed optical fiber units is made very narrow, as pointed out hereinbefore.

Figure 4:
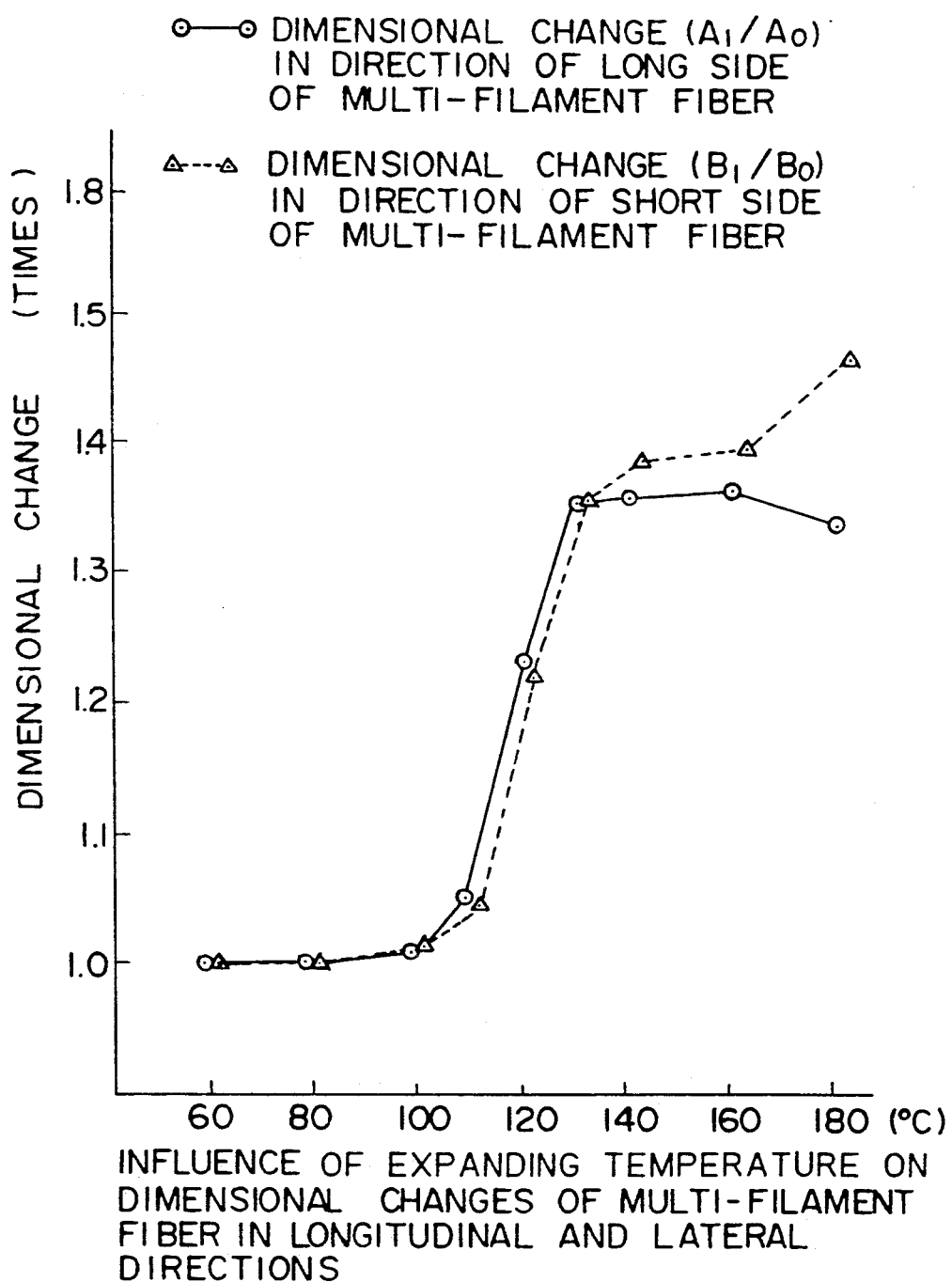
FIG. 4 is a graph illustrating the relationship between the expanding temperature and the degree of the change of the dimension; and, FIG. 5 is an end face view showing the state where a plurality of optical fiber units are closed and inserted in a cap and heat-expand-treated.
Figure 5:
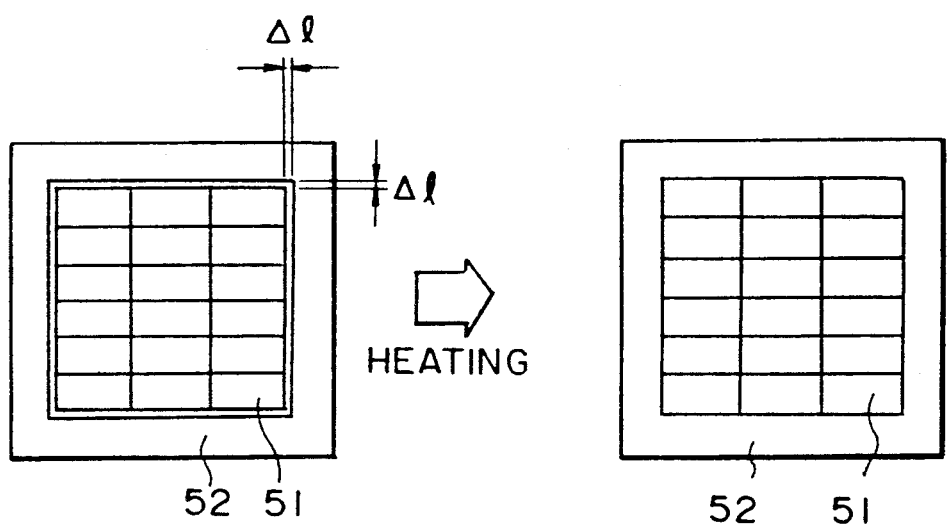

One multi-filament type optical fiber unit having a rectangular section, which is formed by using polymethyl methacrylate as the core component and a fluoroacrylate polymer as the sheath component and polymethyl methacrylate as the sea component, is heat-treated by a hot air drier in the free state without being restrained by a cap or the like. In FIG. 4, the temperature is plotted on the abscissa and the change of the dimension of each side of the section is plotted on the ordinate. If the heat treatment is carried out without any restraint, each side of the section is expanded so that the length becomes about 1.4 to about 1.5 times the original length, but as can be seen, it is within an expansion ratio of up to about 1.4 that the behaviors in both the longitudinal and lateral directions are substantially the same. The heating temperature for stably expanding the multi-filament type plastic optical fiber is 100° to 160° C., preferably 110° to 140° C. FIG. 5 is an end face view illustrating the state where many multi-filament type optical fiber units 51 having a rectangular section are closed and inserted in a cap 52.

Many multi-filament type optical fiber units 51 showing the above-mentioned behavior are heated and expanded in the state where one ends of the units 51 are fixed in the cap 52. To smoothly close and insert many multi-filament type optical fiber units 51 in the cap 52, the inner dimension of the cap 52 should be a little larger than the outer dimension of the entire assembly of the optical multi-filament type fiber units 51. Namely, a certain clearance ($\Delta l$) is necessary, and the final expansion quantity corresponds to this clearance. From the results shown in FIG. 4, the clearance can be increased to up to 1.4 times the dimension of the entire assembly of the multi-filament optical fiber units 51. The relative position of each optical fiber unit 51 after the expanding treatment will now be considered. Note, the units can be arranged at a high accuracy before the heat treatment, but it cannot be guaranteed that, after the heat treatment, the fiber units will retain the same relative positions. Namely, since each fiber unit 51 is expanded in the free state without any restraint, all of the optical fiber units are not always expanded under the same conditions through the same course, and the relative positions of the fiber units can be deviated. If the photoconductor is used as the light guide only for transmitting light energy, the deviation of the alignment does not cause any particular problem, but when the photoconductor is used for transmitting a picture, the deviation of the alignment results in a distortion of the picture and renders the transmission impossible. Therefore, to obtain an optical fiber photoconductor for the transmission of a picture, it is especially necessary that the alignment accuracy be increased.

As the result of investigations made by the inventors, it was found that the dimensional change having no influence on the transmission of a picture is such that the length after the expanding treatment is 1.01 to 1.2 times the original length, and if the dimensional change exceeds this range, the distortion of a picture becomes noticeable. The relationship shown in FIG. 4 is that observed when the material of the multi-filament type optical fiber unit is a specific material, and if a different material is used, the behavior is naturally changed and the upper limit also changed. Nevertheless, the range of the expansion ratio for controlling distortion of a picture is determined by the above-mentioned clearance, and therefore, this range is common to all the cases. A heat treatment, especially a dry heat treatment, is preferably adopted as the expanding treatment. Hot air or an infrared ray lamp can be used as the heating means, and ultrasonic waves can be used for certain materials.

On the end face of the optical fiber photoconductor of the present invention, spaces among closed multi-filament type optical fiber units are not substantially conspicuous and an image can be transmitted very clearly, and good effects can be attained when the optical fiber photoconductor of the present invention is used for an endoscope or the like. When the photoconductor of the present invention is used as a light guide, the light transmission efficiency can be increased while reducing the unevenness of the light quantity, and a very effective light guide can be provided.

The present invention will now be described in detail with reference to the following example.

EXAMPLE 1

A multi-filament type optical fiber unit having a rectangular section of $1730\mu \times 660\mu$, which comprised 194 filaments arranged in a pattern of stacked straw bags, each filament comprising a core-sheath island having a diameter of $75\mu$ and having a core of polymethyl methacrylate and a sheath of a fluoroacrylate polymer and a sea of polymethyl methacrylate surrounding the island, was prepared according to the process disclosed in Japanese Unexamined Patent Publication No. 63-2999911. In the state where 78 of the so-prepared multi-filament type optical fiber units having a length of 1 m were arranged in 6 lines and 13 columns, the units were laminated and inserted into a cap. The cap portion was put into a hot air drier and heated at 160° C. for 30 minutes.

In the end face of the obtained product, the multi-filament type optical fiber units were bonded to one another with no substantial space in the closed interface between each two closed units, as shown in FIG. 1, and it was confirmed that, when an image was transmitted by using the obtained photoconductor, spaces among the optical fiber units could be substantially neglected and the product was a high-quality image bundle.

We claim:

1. An optical fiber photoconductor, which comprises at least two multi-filament type plastic optical fiber units arranged in parallel and having a substantially rectangular peripheral shape and at least one end fixed in a cap, each optical fiber unit having 50 to 10000 core-sheath light-transmitting islands having a diameter of 5 to $200\mu$, which are densely arranged in a sea portion, wherein in each of the multi-filament plastic optical fiber units having a rectangular sectional shape, the end face fixed in the cap is expanded so that the length of one side of the end face is at least 1.01 times the original length of one side of the rectangular peripheral shape of the multi-filament type plastic optical fiber unit, whereby a closing interface between the multi-filament type plastic optical fiber units substantially disappears.

2. A photoconductor as set forth in claim 1, wherein at said one end fixed in a cap, the multifilament type plastic optical fiber units are piled up so as to form a sheet or rectangular shape.

3. A photoconductor as set forth in claim 1, wherein said end face fixed in the cap is expanded so that the length of one side of the end face is 1.01 to 1.2 times the original length of one side of the rectangular peripheral shape of the multi-filament plastic optical fiber unit.

4. A photoconductor as set forth in claim 1, wherein said expansion of the end face is effected at a temperature of 100° to 160° C.

5. A photoconductor as set forth in claim 1, wherein said core-sheath island has a core of polymethyl methacrylate and a sheath of a fluoroacrylate polymer and said sea portion is comprised of polymethyl methacrylate.

* * * * *